US010635348B2

(12) United States Patent
Yang et al.

(10) Patent No.: US 10,635,348 B2
(45) Date of Patent: Apr. 28, 2020

(54) STORAGE SYSTEM AND METHOD FOR STORAGE CONTROL

(71) Applicant: EMC IP Holding Company LLC, Hopkinton, MA (US)

(72) Inventors: Lifeng Yang, Beijing (CN); Xinlei Xu, Beijing (CN); Jian Gao, Beijing (CN); Yousheng Liu, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 41 days.

(21) Appl. No.: 15/846,798

(22) Filed: Dec. 19, 2017

(65) Prior Publication Data

US 2018/0173466 A1 Jun. 21, 2018

(30) Foreign Application Priority Data

Dec. 21, 2016 (CN) .......................... 2016 1 1193454

(51) Int. Cl.
*G06F 3/06* (2006.01)
*G06F 12/0866* (2016.01)

(52) U.S. Cl.
CPC ............ *G06F 3/0659* (2013.01); *G06F 3/061* (2013.01); *G06F 3/0604* (2013.01); *G06F 3/0688* (2013.01); *G06F 3/0689* (2013.01); *G06F 12/0866* (2013.01); *G06F 2212/1008* (2013.01); *G06F 2212/154* (2013.01);
(Continued)

(58) Field of Classification Search
CPC ...... G06F 3/0604; G06F 3/061; G06F 3/0611; G06F 3/0656; G06F 3/0658; G06F 3/0688; G06F 3/0689; G06F 12/0688; G06F 2212/154; G06F 2212/214; G06F 2212/312; G06F 2212/263; H04L 49/10
See application file for complete search history.

(56) References Cited

U.S. PATENT DOCUMENTS 9,003,129 B1    4/2015 Harvey et al.
9,921,753 B2 *  3/2018 Samanta ............... G06F 3/0665
(Continued)

FOREIGN PATENT DOCUMENTS

WO    WO-2017131752 A1 *  8/2017 ........... G06F 3/0665

OTHER PUBLICATIONS

Krishnan, Suresh, et al.; "Remote Mirroring for Data Storage Systems Using Cloud Backup," U.S. Appl. No. 15/198,304, filed Jun. 30, 2016.

(Continued)

*Primary Examiner* — Aracelis Ruiz
(74) *Attorney, Agent, or Firm* — BainwoodHuang

(57) ABSTRACT

A storage system and a method for storage control comprises a host device and a switch, and the switch supports remote direct memory access (RDMA). The storage system further comprises a first and second storage control modules, the first storage control module includes a first cache and the second storage control module includes a second cache. The host device, the first and second storage control modules are interconnected via the switch, and the first storage control module is capable of synchronizing the cached data with the second storage control module via the switch. The storage system further comprises a storage array connected to the first and second storage control modules.

21 Claims, 9 Drawing Sheets

(52) U.S. Cl.
CPC .. *G06F 2212/214* (2013.01); *G06F 2212/263* (2013.01); *G06F 2212/312* (2013.01)

(56) References Cited

U.S. PATENT DOCUMENTS

| | | | |
|---|---|---|---|
| 2015/0012607 A1* | 1/2015 | Cayton | G06F 3/067 |
| | | | 709/212 |
| 2015/0261720 A1* | 9/2015 | Kagan | G06F 3/0659 |
| | | | 711/103 |
| 2016/0085718 A1* | 3/2016 | Huang | G06F 13/00 |
| | | | 709/213 |
| 2016/0266813 A1* | 9/2016 | Supnik | G06F 3/0659 |
| 2017/0039150 A1* | 2/2017 | Dreier | G06F 12/023 |

OTHER PUBLICATIONS

Han, Geng, et al.; "Task-Based Framework for Synchronization of Event Handling Between Nodes in an Active/Active Data Storage System," U.S. Appl. No. 15/662,797, filed Jul. 28, 2017.

Zhang, Ping, et al.; "Systems and Methods of Synchronizing Configuration Information in a Clustered Storage Environment," U.S. Appl. No. 15/965,156, filed Apr. 27, 2018.

Yang, Yue, et al.; "Method, Apparatus and Computer Program Product for Data Synchronization," U.S. Appl. No. 16/227,683, filed Dec. 20, 2018.

Xu, Hongru, et al.; "Method, Device and Computer Readable Medium for Data Synchronization," U.S. Appl. No. 16/222,072, filed Dec. 17, 2018.

* cited by examiner

STORAGE SYSTEM AND METHOD FOR STORAGE CONTROL

RELATED APPLICATIONS

This application claim priority from Chinese Patent Application Number CN201611193454.0, filed on Dec. 21, 2016 at the State Intellectual Property Office, China, titled "STORAGE SYSTEM AND METHOD FOR STORAGE CONTROL" the contents of which is herein incorporated by reference in its entirety.

FIELD

Embodiments of the present disclosure generally relate to the field of storage technology, and more specifically, to a storage control system and a method for storage control.

BACKGROUND

A storage system is a system which includes a storage device, a storage control module and a device and program for managing information scheduling, and it generally can store a large amount of data. To ensure security of data storage, the storage system generally provides two peer storage control modules to be mirror with each other. These two storage control modules maintain data synchronization therebetween.

A peripheral component interconnect (PCI) is a parallel computer bus standard for connecting peripheral components to the computer. PCI Express (PCIe) is a type of bus and interface standard. Different from PCI bus, PCIe adopts point-to-point serial communication and can improve data transmission rate to a very high frequency. Generally, two peer storage control modules in the storage system are interconnected via PCIe for data synchronization and backup.

SUMMARY

Embodiments of the present disclosure provide a storage system and a method for storage control. Embodiments of the present disclosure can unify the implementation of data communication within a storage system by use of a network enabling remote direct memory access (RDMA), thereby improving data reading and writing efficiency within the storage system and achieve remote data mirroring at low-latency.

According to an aspect of the present disclosure, there is provided a storage system. The storage system comprises: a host device; a switch enabling RDMA; a first storage control module including a first cache; a second storage control module including a second cache, wherein the host device and the first and second storage control modules are interconnected via the switch, and the first storage control module is able to synchronize cached data with the second storage control module via the switch; and a storage array connected to the first and second storage control modules.

According to another aspect of the present disclosure, there is provided a method for storage control. The method comprises: receiving data, by a first storage control module, from a host device via a switch, wherein the switch enables remote direct memory access (RDMA); caching data, by a first storage control module, to a first cache in the first storage control module; sending, by the first storage control module via the switch, the cached data to the second storage control module; and writing data, by the first storage control module, to a storage array.

According to yet another aspect of the present disclosure, there is provided a computer program product which is tangibly stored on a non-transient computer-readable medium and comprises computer-executable instructions, and the computer-executable instructions, when executed, cause the computer to implement the method according to embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the embodiments of the present disclosure.

BRIEF DESCRIPTION OF THE DRAWINGS

Through the following detailed description of the example embodiments of the present disclosure with reference to the accompanying drawings, the above and other objectives, features, and advantages of the present disclosure will become more apparent. In example embodiments of the present disclosure, the same reference signs usually represent the same components.

DETAILED DESCRIPTION OF EMBODIMENTS

Figure 1:
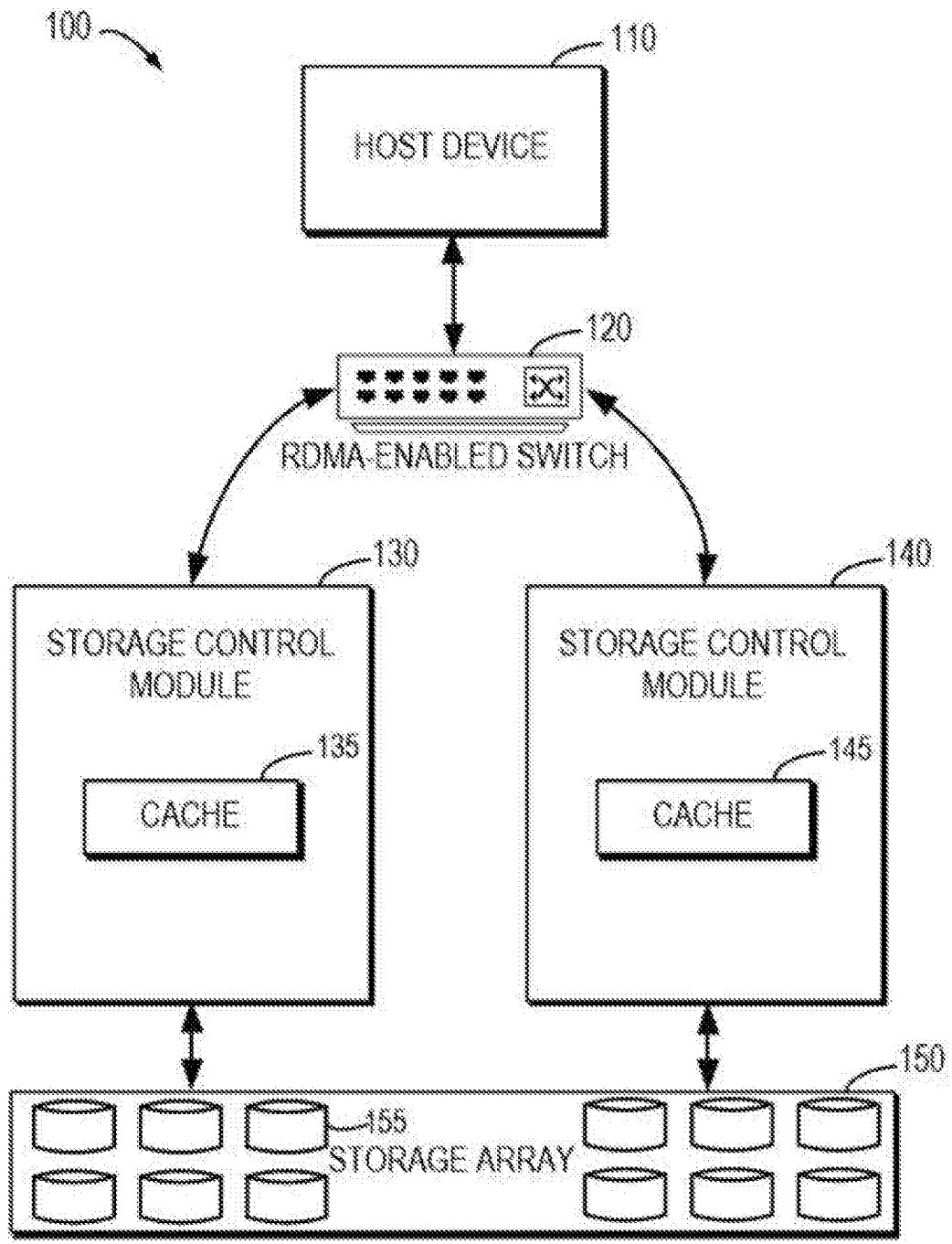
FIG. 1 is a block diagram illustrating a storage system according to an embodiment of the present disclosure.

Preferred embodiments of the present disclosure will be described in the following text in greater detail with reference to the drawings. Although preferred embodiments of the present disclosure are displayed in the drawings, it should be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." Terms "first," "second" and others can denote different or identical objects. The following text may also contain other explicit or implicit definitions.

Traditionally, in a storage system including two peer storage control modules, the two peer storage control modules communicate data and metadata with each other via a PCIe bus (such as a communication manager interface (CMI)) so that each storage control module can communicate with its peer storage control module. For example, when the two storage control modules want to mirror data, they need to transmit data via the PCIe bus. However, as the host device for accessing data generally communicates with a storage control module via a networks such as Ethernet, the storage system requires multiple network interfaces (such as PCIe bus interface and Ethernet interface) for completing data transmission. Besides, since the transmission distance of the PCIe bus is very short, the PCIe bus cannot support remote connection and access. Therefore, the traditional storage system cannot use a uniform network interface or support remote data mirroring.

Embodiments of the present disclosure use a RDMA-enabled network to unify the data communication within a storage system, namely, use one network type to substitute both the traditional Ethernet and PCIe buses. Thus, the RDMA-enabled network can be utilized for access between storage control modules and between the host and storage control modules. Therefore, embodiments of the present disclosure can improve data reading and writing efficiency within the storage system, and achieve remote data mirroring at low-latency (for example, using copper wires as long as tens of meters, or optical fiber wires as long as tens of kilometers). Besides, embodiments of the present disclosure convert the traditional PCIe-based point-to-point access manner into networked access manner, thereby expanding components in the storage system effectively.

Moreover, embodiments of the present disclosure can retain the traditional connection manner of the storage system such that the storage system according the embodiments of the present disclosure can not only be compatible to old devices but also improve data reading and writing performance of new devices. In addition, embodiments of the present disclosure enable the host device to bypass its processor, memory, file system and protocol stack to communicate directly with cache or solid state disk (SSD) array via RDMA, thereby effectively improving data access efficiency.

Basic principles and several example embodiments of the present disclosure will be described below with reference to FIGS. 1-6. FIG. 1 is a block diagram illustrating a storage system 100 according to an embodiment of the present disclosure. As illustrated in FIG. 1, the storage system 100 comprises a host device 110, a RDMA-enabled switch 120, a storage control module 130 (also referred to as "a first storage control module"), a storage control module 140 (also referred to as "a second storage control module") and a storage array 150. As shown in FIG. 1, the host device 110, the storage control module 130 and the storage control module 140 are interconnected via the switch 120, while storage control modules 130 and 140 are connected to the storage array 150, respectively.

In some embodiments, the host device 110 can be any device capable of accessing data in the storage system 100 via the switch 120. The host device 110 can write data to or read data from disks in the storage system. For example, the host device 110 can be a server, including but not limited to, an application server, a streaming media server and so on. Alternatively, the host device 110 can also be a computing device, including but not limited to, a desktop computer, a laptop computer, a handheld computer, a smart phone, a tablet computer, a wearable and the like.

The switch 120 can enable or support RDMA operations, where RDMA is a technique that supports direct communication from a remote memory to the memory, without any processor or processing unit. With the RDMA-enabled network adapter, all the packets and protocol processing for communication can be implemented on network adapter hardware, thereby improving the performance of accessibility. In some embodiments, the switch 120 can be, for instance, Infiniband (IB) network switch, RDMA over Converged Ethernet (RoCE), Internet wide area RDMA protocol (iWARP) and so on.

Infiniband (IB) network is a cable conversion network that supports multiple concurrent links and represents an input-output standard for a new-generation server hardware platform. Since it has high bandwidth, low latency and high expandability, it is very suitable for communications between host devices (such as replication and distributed-operations), between the host device and the storage device (such as direct memory access), and between the host device and the network. IB network supports RDMA natively, so it can support RDMA between the host device and the storage control module, or between a plurality of storage control modules.

The storage control modules 130 and 140 are devices or components for storage control of data storage in the storage system 100. As shown in FIG. 1, the storage control module 130 includes a cache 135 (referred to as "first cache) and the storage control module 140 includes a cache 145 (referred to as "second cache"). In some embodiments, the caches 135 and 145 can be dynamic random access memory (DRAM) caches. According to embodiments of the present disclosure, the cache 135 can synchronize data with the cache 145 via the switch 120 without a particular access interface (such as PCIe interface). In some embodiments, caches 135 and 145 can be software components for optimizing DRAM in a storage control module to improve reading and writing performances of the host device. In some embodiments, the storage system 100 supports symmetric active/active access model so that the host device 110 simultaneously utilizes two storage control modules (such as storage control modules 130 and 140) to access logic unit number (LUN).

The storage array 150 comprises a plurality of disks 155. Examples of disks 155 include but are not limited to magnetic disk, optical disk and so on. The storage array 150 can be an array of disks formed by a plurality of independent physical disks in different manners (namely, logical disk) and can provide higher storage performance and better reliability than a single disk. To restore data when a certain disk in the storage array 150 fails, one or more parity check information blocks are generally set.

In the storage system 100 shown in FIG. 1, the host device 110 may send data to the storage control module 130 via the switch 120. After receiving data, the storage control module 130 may store data in the cache 135 therein, and synchronize the cached data to the cache 145 in the storage control module 140 via the switch 120. As the switch 120 can enable synchronization and mirroring of cached data between storage control modules, storage control modules do not need a particular PCIe interface for communications, thereby simplifying the architecture of the storage system 100 and improving data reading and writing efficiency in the storage system.

Figure 2:
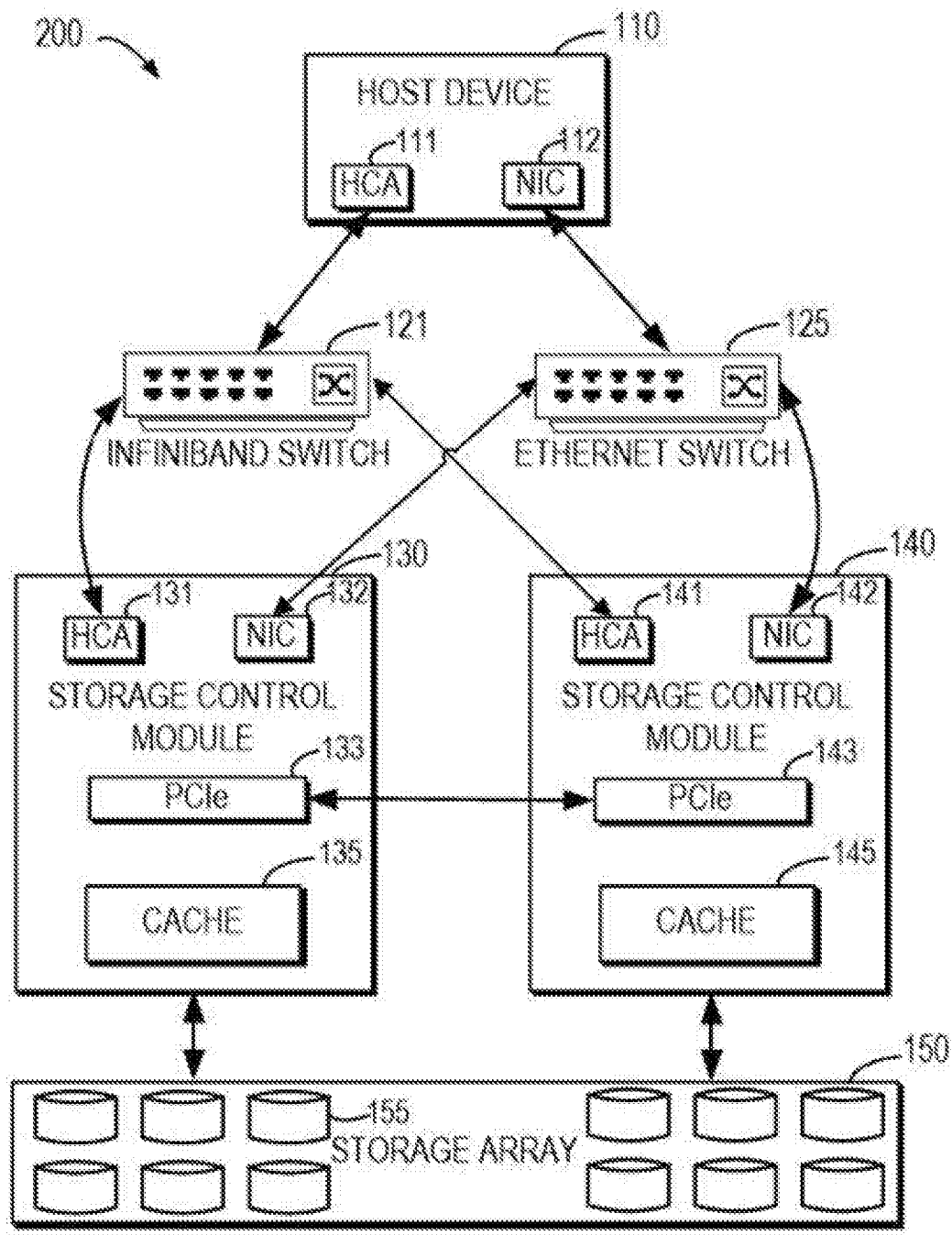
FIG. 2 is a block diagram illustrating a storage system according to another embodiment of the present disclosure.

FIG. 2 is a block diagram illustrating a storage system 200 according to another embodiment of the present disclosure. Compared with the storage system 100 shown in FIG. 1, the storage system 200 further supports the traditional data access manner. As illustrated in FIG. 2, the RDMA-enabled switch in the storage system 200 is a IB network switch 121, and the storage system 200 further includes an Ethernet switch 125.

As shown in FIG. 2, the host device 110, the storage control module 130 and the storage control module 140 each include at least two network cards, such as host channel adapter (HCA) cards 111, 131, 141, and network interface cards (NICs) 112, 132, 142. HCA card 111 in the host device 110, HCA card 131 in the storage control module 130 and HCA card 141 in the storage control module 140 are interconnected via a IB network switch 121, and NIC 112 in the host device 110, NIC 132 in the storage control module 130 and NIC 142 in the storage control module 140 are interconnected via the Ethernet switch 125. Besides, the storage control module 130 further includes a PCIe interface 133, the storage control module 140 further includes a PCIe interface 143, and the PCIe interface 133 and PCIe interface 143 are interconnected via a PCI bus.

By utilizing two kinds of switches to support simultaneously multiple manners of data transmission, the storage system 200 according to embodiments of the present disclosure enables the system according to embodiments of the present disclosure not only to be compatible to old devices (such as through the traditional data path) but also to improve the performance of new devices (such as through rapid data path). Besides, as IB network switch has low latency, embodiments of the present disclosure can effectively improve data reading and writing speeds of the storage system.

Figure 3:
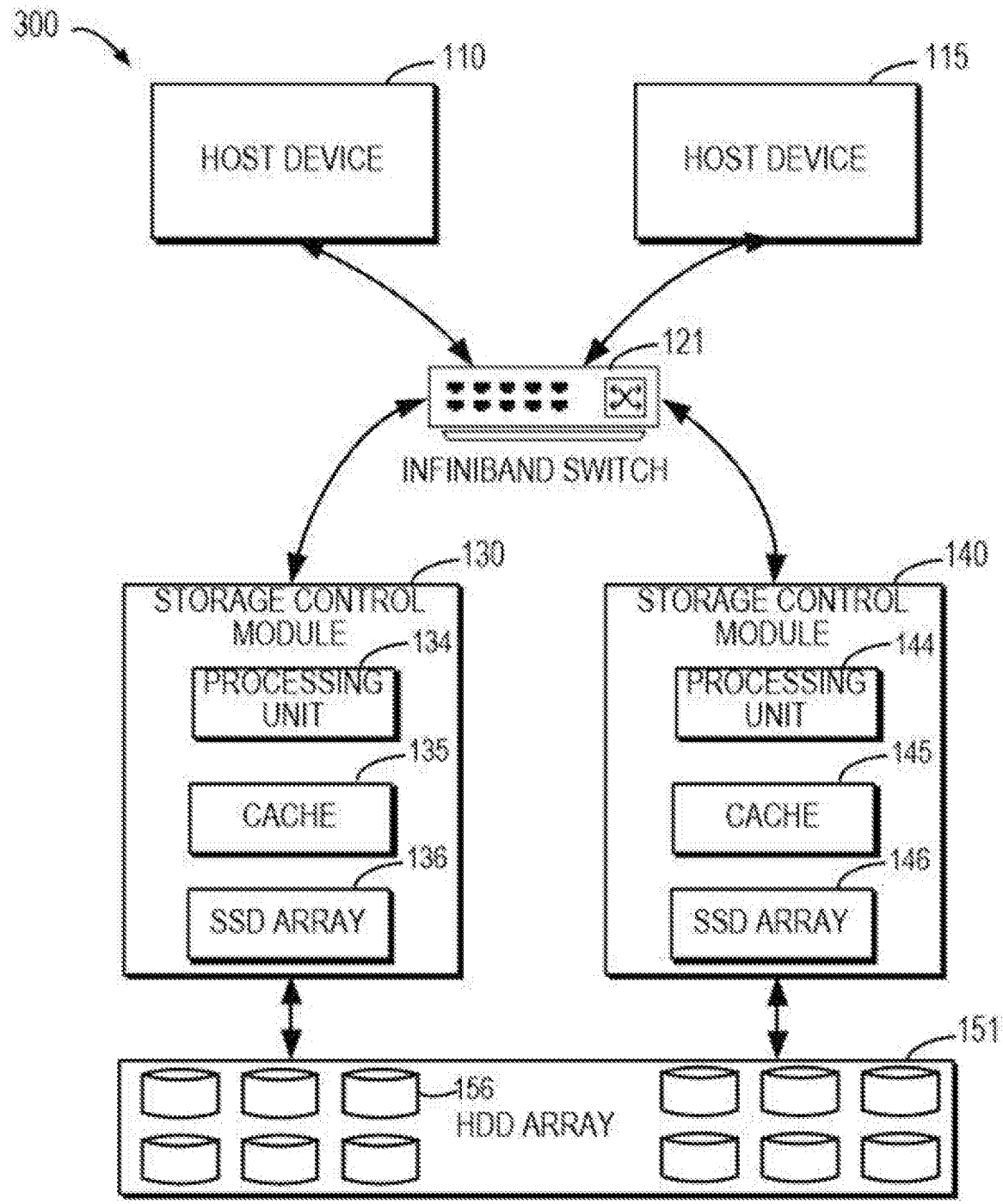
FIG. 3 is a block diagram illustrating a storage system according to yet another embodiment of the present disclosure.

FIG. 3 is a block diagram illustrating a storage system 300 according to yet another embodiment of the present disclosure. As illustrated in FIG. 3, the storage system 300 includes a plurality of host devices, such as host devices 110 and 115 (the host device 115 is also referred to as "another host device") and a plurality of storage control modules, such as storage control modules 130 and 140. These host devices and storage control modules are interconnected via IB network switch 121. The storage system 300 further includes a hardware disk drive (HDD) array 151 which is comprised by a plurality of disks 156, and storage control modules 130 and 140 are connected to HDD array 151, respectively.

As shown in FIG. 3, the storage control module 130 includes a processing unit 134, a cache 135 and a solid state disk (SSD) array 136, and the storage control module 140 includes a processing unit 144, a cache 145 and an SSD array 146. The SSD array 136 may synchronize data with SSD array 146 via the IB network switch. Synchronization of data in SSD array based on IB network is described below in detail with reference to FIG. 4C. For the ease of discussion, the processing unit 134 is referred to as "first storage unit," SSD array 136 is referred to as "first SSD array," processing unit 144 is referred to as "second processing unit," and SSD array 146 is referred to as "second SSD array" below.

In some embodiments, in the storage system 300, the host device 110 can communicate data directly with the cache 135 without through the processing unit 134 or other components (such as protocol stack) in the storage control module 130. In some embodiments, the host device 110 can also communicate data directly with the SSD array 136 without through the processing unit 134 or cache 135 or other components. Therefore, the storage system according to embodiments of the present disclosure can provide direct memory access without the participation of other components in the storage control module, thereby improving data reading and writing efficiency.

In the traditional storage system, since storage control modules generally transmit data via a PCIe interface and the amount of data in the SSD array is normally large, the traditional storage system does not synchronize these data but just synchronize metadata. Conversely, since high-speed IB network is used to synchronize data in the SSD array, the storage system according to the embodiments of the present disclosure can synchronize data in the SSD array directly, thereby improving stability of the storage system. Besides, since the storage system according to the technology of the present disclosure can synchronize large amount of data quickly, synchronization of erasure codes and outward expansion of data switch modules can also be realized.

Figure 4A:
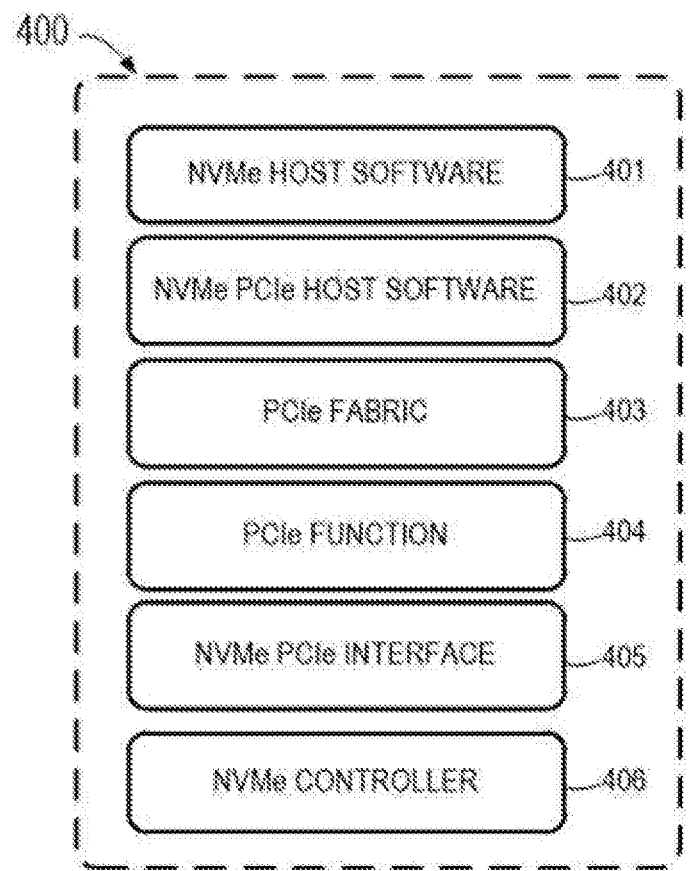
FIG. 4A is a schematic diagram for implementing an NVMe architecture over PCIe according to embodiments of the present disclosure.

FIG. 4A is a schematic diagram for implementing a non-volatile memory Express (NVMe) architecture 400 over PCIe according to embodiments of the present disclosure. NVMe is a logic device interface standard for accessing a non-volatile storage medium attached through a PCIe bus. NVMe is generally used in a flash memory in the form of SSD, and it can mirror parallel mechanisms of a processing unit, platform or application by means of a parallel mechanism of a flash-based storage device. It has the characteristics of low latency, high input/output operation per second (IOPS), low power consumption and wide drive practicability.

As shown in FIG. 4A, architecture 400 includes an NVMe host software layer 401, an NVMe PCIe host software layer 402, a PCIe fabric layer 403, a PCIe function layer 404, an NVMe PCIe interface layer 405 and an NVMe control module layer 406 in order. The architecture 400 defines the access specification of NVMe over the PCIe bus and can achieve NVMe access between host software (such as software operating on the host device 110) and a control module (such as the storage control module 130) via PCIe.

Figure 4B:
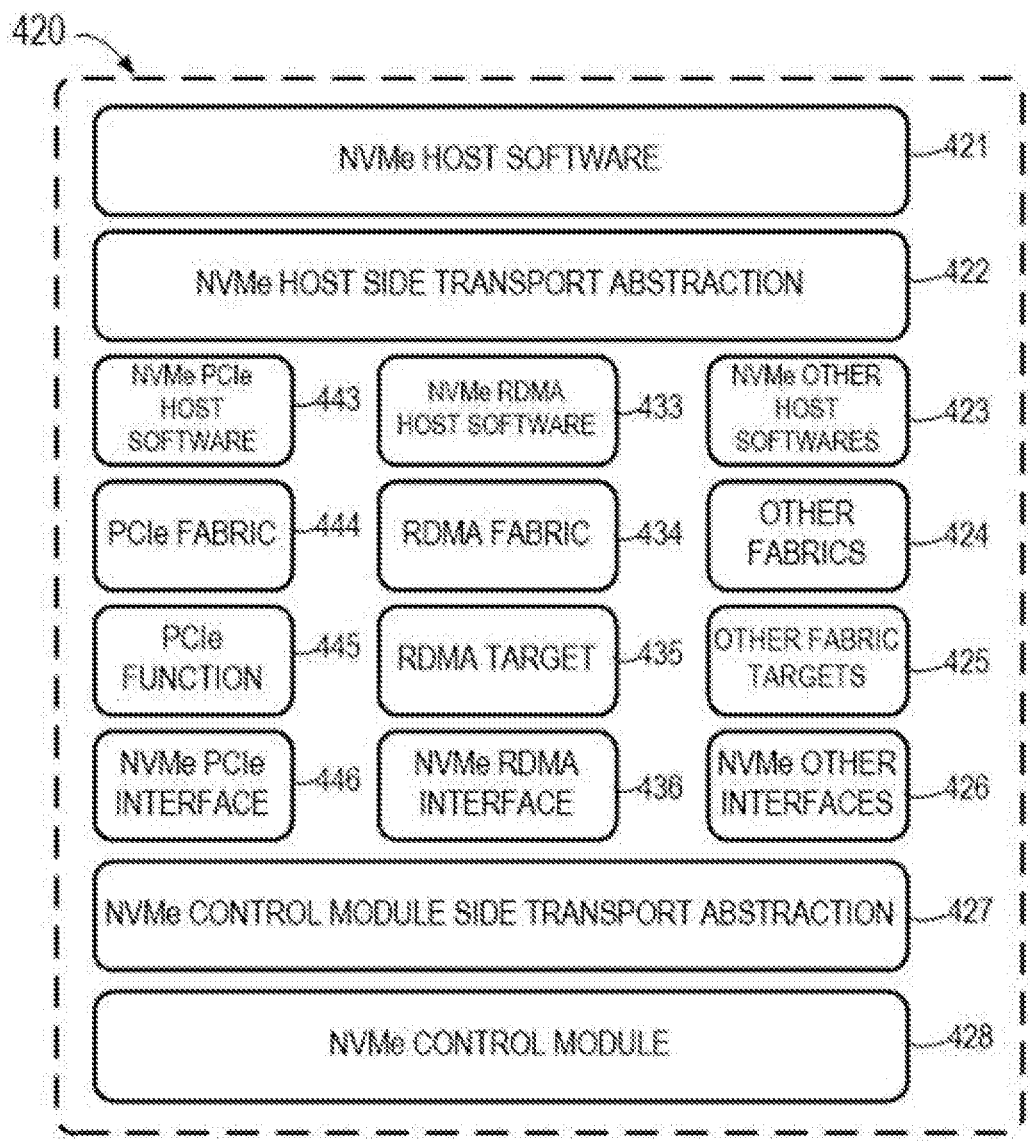
FIG. 4B is a schematic diagram for implementing an NVMe architecture over multiple fabrics according to embodiments of the present disclosure.

FIG. 4B is a schematic diagram for implementing an NVMe architecture 420 over multiple fabrics according to embodiments of the present disclosure. NVMe over Fabrics can support NVMe access of multiple structural types (such as PCIe, Infiniband network, Ethernet, optical fiber channel and so on) by defining a flexible transport abstraction layer. This NVMe over multiple fabrics can provide a physical layer abstract transmission mechanism with low latency and expandability for NVMe.

As illustrated in FIG. 4B, the architecture 420 includes an NVMe host software layer 421, an NVMe host side transport abstraction layer 422, an NVMe control module side transport abstraction layer 427 and an NVMe control module layer 428. The architecture 420 expands transmission between the host software and control modules so as to enable it to achieve NVMe access over multiple fabrics.

As shown in FIG. 4B, the architecture 420 further includes an NVMe PCIe host software layer 443, a PCIe fabric layer 444, a PCIe function layer 445 and an NVMe PCIe interface layer 446 and can achieve NVMe access between the host software (such as software operating on the host device 110) and the control modules (such as storage control module 130) via PCIe. Besides, the architecture 420 further includes an NVMe RDMA host software layer 433, an RDMA fabric layer 434, an RDMA target layer 435 and an NVMe RDMA interface layer 436 and can achieve NVMe access between the host software and the control modules via RDMA. In addition, the architecture 420 further includes an NVMe other fabric host software layer 423, other fabric layer 424, other fabric target layer 425 and an NVMe structural interface layer 426 and can achieve NVMe access between the host software and the control modules via any other network fabrics currently developed or to be developed in the future.

Figure 4C:
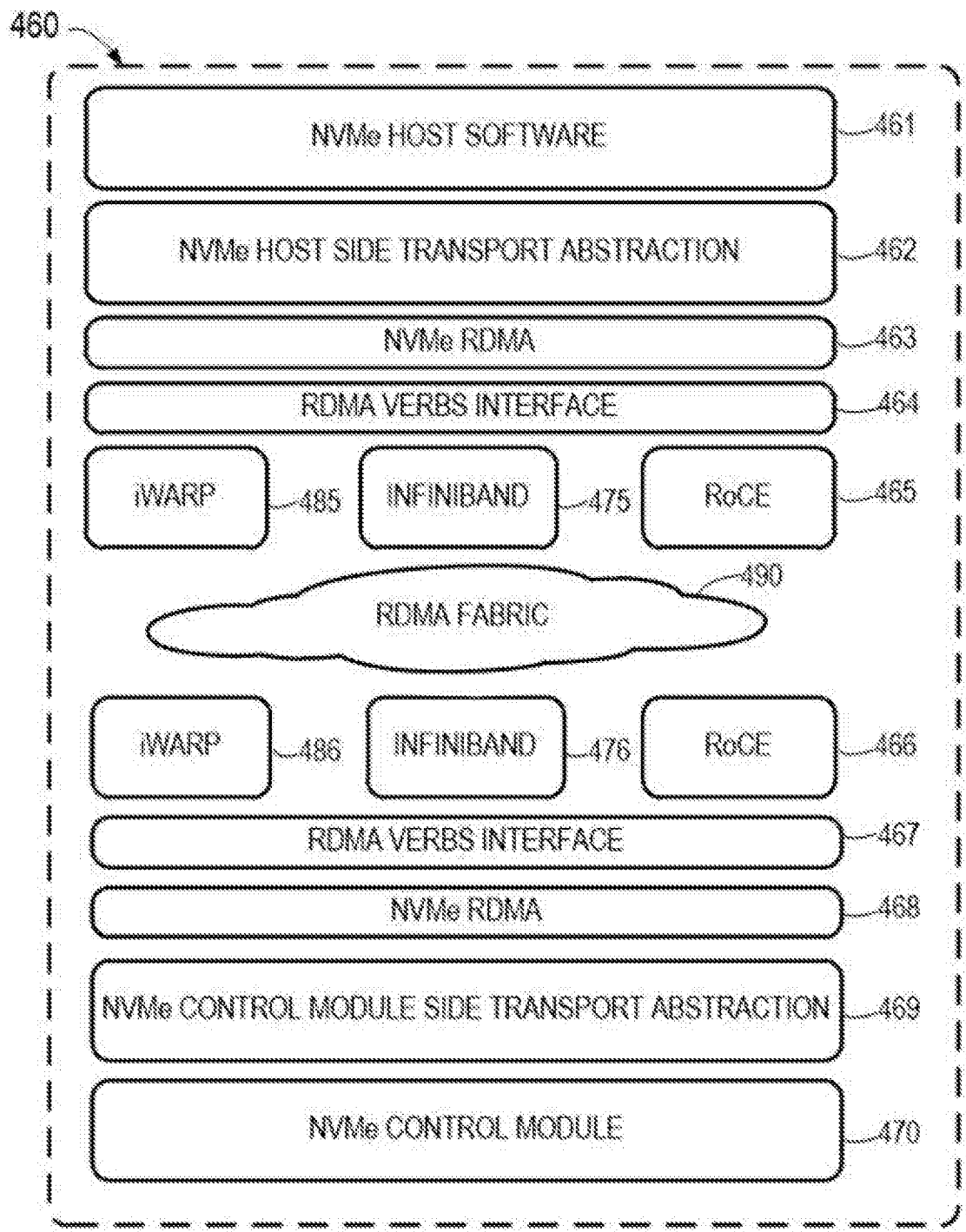
FIG. 4C is a schematic diagram for implementing an NVMe architecture over RDMA according to embodiments of the present disclosure.

FIG. 4C is a schematic diagram for implementing an NVMe architecture 460 over RDMA (NVMe over RDMA) according to embodiments of the present disclosure. As illustrated in FIG. 4C, the architecture 460 includes an NVMe host software layer 461, an NVMe host side transport abstraction layer 462, an NVMe control module side transport abstraction layer 469 and an NVMe control module layer 470. The architecture 420 expands the transmission between the host software and the control modules so as to enable it to implement NVMe access over RDMA.

As shown in FIG. 4C, the architecture 460 further includes NVMe RDMA layers 463 and 468 and NVMe Verbs interface layers 464 and 467, and NVMe Verbs is used to provide an application program interface specification for NVMe Verbs. As illustrated in FIG. 4C, with RDMA structural layer 490, NVMe over RDMA can achieve, for instance, NVMe transmission over iWARP (such as iWARP 485 and 486), NVMe transmission over Infiniband (such as Infiniband 475 and 476) and NVMe transmission over RoCE (such as RoCE 465 and 466).

Therefore, by enabling NVMe to enable access over RDMA, data in SSD array can be synchronized between storage control modules. For example, SSD array 136 and SSD array 146 synchronize data via the IB network switch 121 and using a non-volatile memory Express (NVMe) protocol enabling RDMA so that the storage control modules 130 and 140 do not need a dedicated NVMe interface for connection, which not only simplifies the architecture of the storage system but also improves the data reading and writing speeds.

It should be noted that the architectures described above with reference to FIGS. 4A-4C are only illustrative, not intending to limit the embodiments of the present disclosure. Other hierarchical architectures may also be used to implement embodiments of the present disclosure, whether these architectures are currently known or to be developed in the future.

Figure 5:
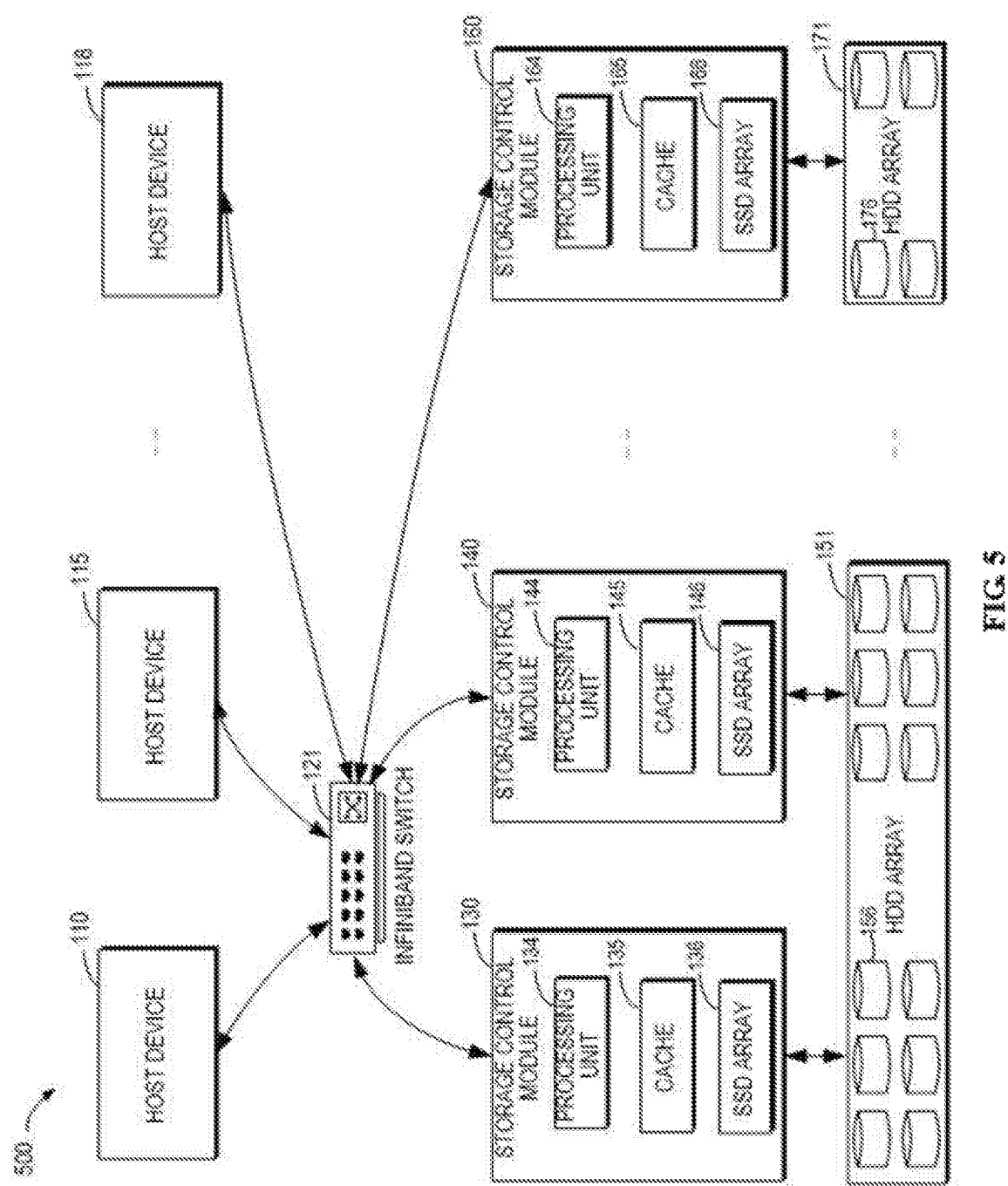
FIG. 5 is a block diagram of a storage system according to still another embodiment of the present disclosure.

FIG. 5 is a block diagram of a storage system 500 according to still another embodiment of the present disclosure. Compared with the storage system 300 depicted with reference to FIG. 3, the storage system 500 further includes a storage control module 160 (referred to as "a third storage control module") which is geographically remote from the storage control module 130. The storage control module 160 includes a processing unit 164, a cache 165 and an SSD array 166. For instance, the storage control module 160 and the storage control module 130 can be distanced from each other several kilometers or tens of kilometers. Since IB network can enable remote RDMA access, the storage control module 160 can synchronize the cached data or data in SSD array with the storage control module 131 via the IB network switch 121.

As shown in FIG. 5, the storage system 500 includes an HDD array 171 connected with the storage control module 160, the HDD array 171 is also a disk array formed by a plurality of disks 176. Besides, the storage system further includes a host device 118 geographically remote from the host device 110, the host device 118 is also applicable to communicate data with any of the storage control modules 130, 140 and 160 via IB network switch 121.

Since IB network has the characteristics of high speed and low latency, the storage system according to the present disclosure can achieve remote data mirroring with low-latency and provide remote data backup. Therefore, when the local storage control module and HDD array are damaged by a physical disaster, the storage system according to the embodiments of the present disclosure can provide remote disaster recovery. In addition, as networked manner of connection, rather than the traditional point-to-point connection manner, is adopted between storage control modules, embodiments of the present disclosure can perform synchronization of cached data between more than two storage control modules.

Figure 6:
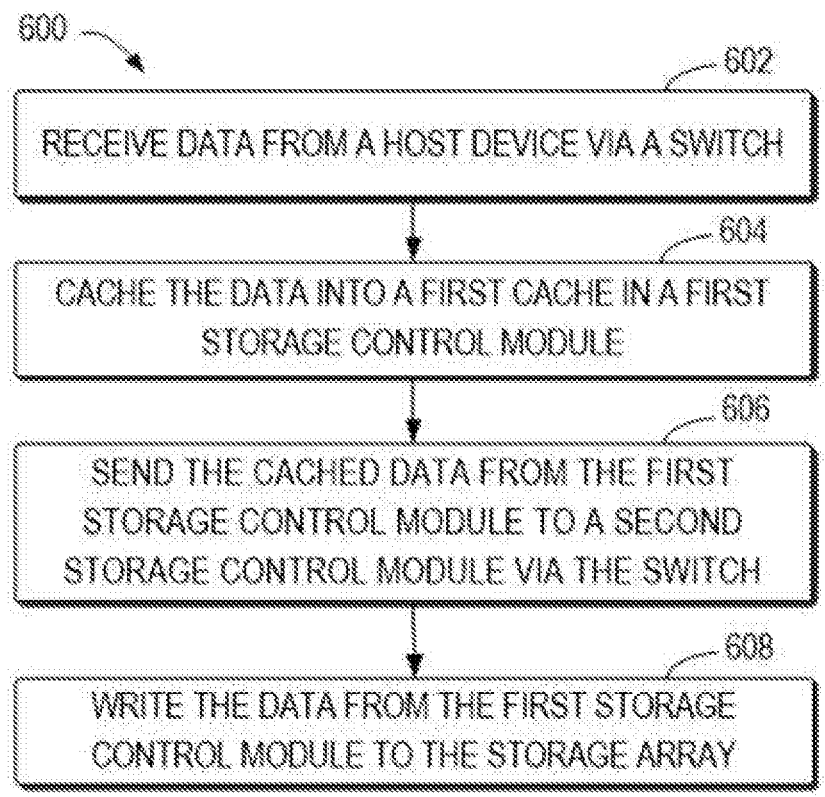
FIG. 6 is a flowchart illustrating a method for storage control according to embodiments of the present disclosure.

FIG. 6 is a flowchart illustrating a method 600 for storage control according to embodiments of the present disclosure. It shall be appreciated that method 600 can be executed by any of the storage control modules 130, 140 and 160 depicted above with reference to FIGS. 1-3 and 5.

At 602, data are received from the host device via a switch. For instance, the storage control module 130 receives data from the host device 110 via the IB network switch 121. At 604, data are cached in a first cache in the first storage control module. For example, data received by the storage control module 130 from the host device 110 are cached in the cache 135.

At 606, the cached data are transmitted from the first storage control module to the second storage control module via the switch. For example, the storage control module 130 sends cached data to the storage control module 140 via an IB network switch 121. At 608, data are written from the first storage control module into the storage array. For example, after cached data has been synchronized between the storage control module 130 and the storage control module 140, the storage control module 130 writes data into the storage array 150.

In some embodiments, the method 600 further comprises: receiving, by a first storage control module, a data packet from another host device via an Ethernet switch; caching, by the first storage control module, the data packet into a first cache; sending, by the first storage control module, the cached data packet to a second storage control module via PCIe bus; and sending, by the first storage control module, data packet to a storage array.

In some embodiments, the method 600 further comprises sending, by the first storage control module, cached data to a third storage control module via the switch, and the third storage control module is geographically remote from the first storage control module.

In some embodiments, the step of sending data to the storage array comprises: sending data from a first cache to a first SSD array in the first storage control module; and sending data from the first SSD array to a storage array. In some embodiments, the step of sending data from the first storage control module to the storage array further comprises: sending data from the first SSD array to the second SSD array in the second storage control module using NVMe protocol over RDMA.

In some embodiments, the step of receiving data from a host device comprises: receiving, at the first cache, data from a host device by bypassing a first processing unit in a first storage control module. In some embodiments, the step of receiving data from the host device further comprises: receiving, at the first SSD array, data from the host device by bypassing both the first processing unit and the first cache. In some embodiments, the switch is infiniband network switch.

Figure 7:
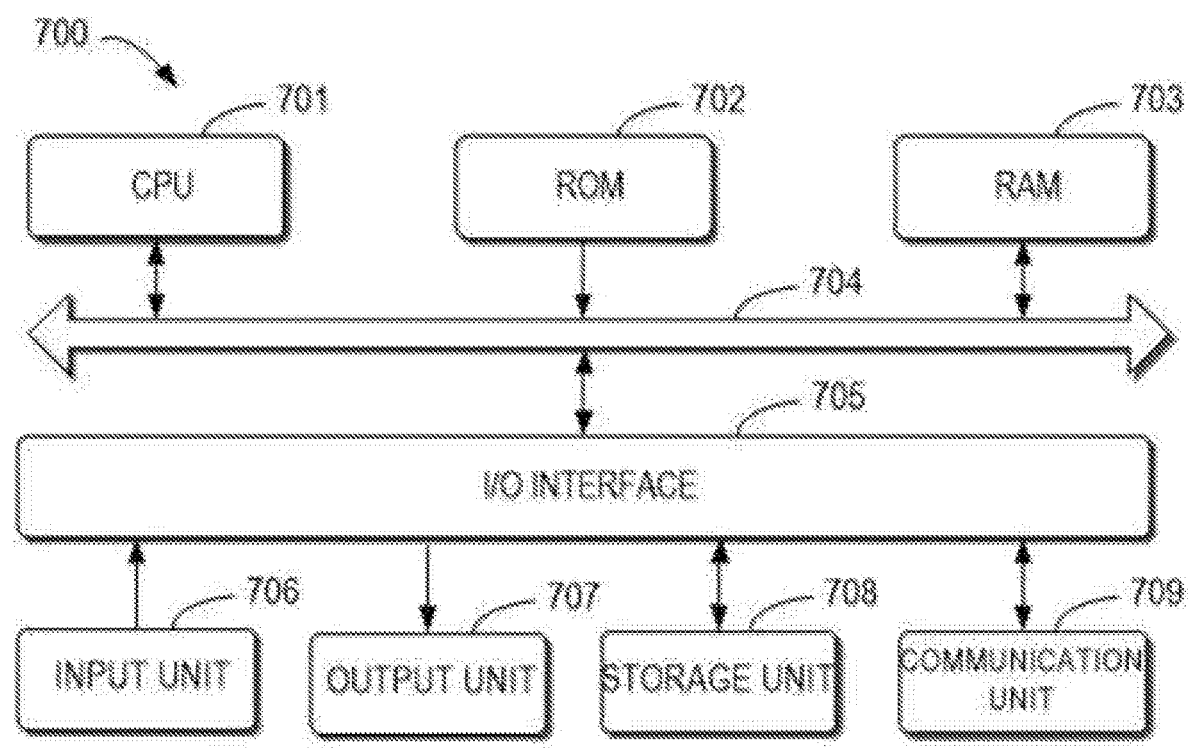
FIG. 7 is a schematic block diagram of a device applicable to implement embodiments of the present disclosure.

FIG. 7 is a schematic block diagram of a device 700 applicable to implement embodiments of the present disclosure. As illustrated, the device 700 comprises a central processing unit (CPU) 701 which can execute various appropriate actions and processing based on the computer program instructions stored in a read-only memory (ROM) 702 or the computer program instructions loaded into a random access memory (RAM) 703 from a storage unit 708. The RAM 703 also stores all kinds of programs and data required by operating the storage apparatus 700. CPU 701, ROM 702 and RAM 703 are connected to each other via a bus 704 to which an input/output (I/O) interface 705 is also connected.

A plurality of components in the apparatus 700 are connected to the I/O interface 705, including: an input unit 706, such as keyboard, mouse and the like; an output unit 707, such as various types of displays, loudspeakers and the like; a storage unit 708, such as magnetic disk, optical disk and the like; and a communication unit 709, such as network card, modem, wireless communication transceiver and the like. The communication unit 709 allows the apparatus 700 to exchange information/data with other devices through computer networks such as Internet and/or various telecommunication networks.

Each procedure and processing described above may be executed by a processing unit 701. For example, in some embodiments, the method can be implemented as computer software programs, which are tangibly included in a machine-readable medium, such as storage unit 708. In some embodiments, the computer program can be partially or completely loaded and/or installed to the device 700 via ROM 702 and/or the communication unit 709. When the computer program is loaded to RAM 703 and executed by CPU 701, one or more steps of the above described method are implemented.

In some embodiments, the method 600 described above can be implemented as a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages comprising object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A storage system, comprising:
a host device;
a switch enabling remote direct memory access (RDMA);
a first storage control module including a first cache, the first storage control module being configured to:
receive data (hereinafter "received data") from the host device via the switch using RDMA and
cache the received data to the first cache, yielding cached data;
a second storage control module including a second cache, the host device and the first and second storage control modules being interconnected via the switch, and the first storage control module being configured to synchronize the cached data with the second storage control module via the switch; and
a storage array connected to the first and second storage control modules.

2. The storage system according to claim 1, wherein the storage system further comprises:
an Ethernet switch via which the host device and the first and second storage control modules are further interconnected; and
a peripheral component interconnect Express (PCIe) bus via which the first and second storage control modules are interconnected.

3. The storage system according to claim 1, wherein the storage system further comprises:
a third storage control module being geographically remote from the first storage control module and being able to synchronize the cached data with the first storage control module via the switch.

4. The storage system according to claim 1, wherein the first storage control module further includes a first solid state disk (SSD) array, the second storage control module further includes a second SSD array, and the first SSD array is able to synchronize data with the second SSD array via the switch.

5. The storage system according to claim 4, wherein the first and second SSD arrays synchronize the data using a non-volatile memory Express (NVMe) protocol over the RDMA.

6. The storage system according to claim 4, wherein the first storage control module further includes a first processing unit, and the host device is able to communicate, via the switch, data with the first cache by bypassing the first processing unit.

7. The storage system according to claim 6, wherein the host device is further able to transmit, via the switch, data with the first SSD array by bypassing both the first processing unit and the first cache.

8. The storage system according to claim 1, wherein the switch is an infiniband network switch.

9. The storage system according to claim 1, wherein the storage system further comprises:
another host device interconnected with the host device and the first and second storage control modules via the switch.

10. The storage system of claim 1 wherein the storage array is directly connected to each of the first and second storage control nodes not via the switch.

11. A method for storage control, comprising:
at a first storage control module:
receiving data from a host device via a switch, the switch enabling remote direct memory access (RDMA);
caching the data to a first cache in the first storage control module;
sending the cached data to a second storage control module via the switch; and
writing the data into a storage array.

12. The method according to claim 11, further comprising:
at the first storage control module:
receiving a data packet from another host device via an Ethernet switch;
caching the data packet into the first cache;
sending the cached data packet to the second storage control module via a peripheral component interconnect Express (PCIe) bus; and
sending the data packet to the storage array.

13. The method according to claim 11, further comprising:
at the first storage control module:
sending the cached data to a third storage control module via the switch, the third storage control module being geographically remote from the first storage control module.

14. The method according to claim 11, wherein the writing the data into the storage array comprises:
sending the data from the first cache to a first solid state disk (SSD) array in the first storage control module; and
sending the data from the first SSD array to the storage array.

15. The method according to claim 14, wherein the writing the data into the storage array further comprises:
sending the data from the first SSD array to a second SSD array in the second storage control module using a non-volatile memory Express (NVMe) protocol over the RDMA.

16. The method according to claim 14, wherein the receiving data from the host device via the switch comprises:
receiving, at the first cache, the data from the host device by bypassing a first processing unit in the first storage control module.

17. The method according to claim 16, wherein the receiving data from the host device via the switch further comprises:
   receiving, at the first SSD array, the data from the host device by bypassing both the first processing unit and the first cache.

18. The method according to claim 11, wherein the switch is an infiniband network switch.

19. A computer program product for storage control, the computer program product comprising:
   a non-transitory computer readable medium encoded with computer-executable code, the code configured to enable the execution of:
      at a first storage control module:
         receiving data from a host device via a switch, the switch enabling remote direct memory access (RDMA);
         caching the data to a first cache in the first storage control module;
         sending the cached data to a second storage control module via the switch; and
         writing the data into a storage array.

20. The computer program product of claim 19, wherein the code is further configured to enable the execution of:
   at the first storage control module:
      receiving a data packet from another host device via an Ethernet switch;
      caching the data packet into the first cache;
      sending the cached data packet to the second storage control module via a peripheral component interconnect Express (PCIe) bus; and
      sending the data packet to the storage array.

21. The computer program product of claim 19, wherein the code is further configured to enable the execution of:
   at the first storage control module:
      sending the cached data to a third storage control module via the switch, the third storage control module being geographically remote from the first storage control module.

* * * * *